(12) United States Patent
Yang et al.

(10) Patent No.: US 10,554,462 B2
(45) Date of Patent: Feb. 4, 2020

(54) COMMUNICATION OF BROADCAST REFERENCE SIGNAL

(71) Applicant: QUALCOMM Incorporated, San Diego, CA (US)

(72) Inventors: Yang Yang, San Diego, CA (US); Jing Jiang, San Diego, CA (US); Tao Luo, San Diego, CA (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/251,946

(22) Filed: Aug. 30, 2016

(65) Prior Publication Data

US 2017/0279647 A1  Sep. 28, 2017

Related U.S. Application Data

(60) Provisional application No. 62/312,332, filed on Mar. 23, 2016.

(51) Int. Cl.
*H04L 27/26* (2006.01)
*H04W 56/00* (2009.01)

(52) U.S. Cl.
CPC ..... *H04L 27/2613* (2013.01); *H04W 56/0035* (2013.01)

(58) Field of Classification Search
CPC ... H04L 27/2613; H04L 5/005; H04L 5/0094; H04L 27/2692; H04W 56/0035
See application file for complete search history.

(56) References Cited

U.S. PATENT DOCUMENTS

| | | | |
|---|---|---|---|
| 2013/0252606 A1 | 9/2013 | Nimbalker et al. | |
| 2013/0331138 A1* | 12/2013 | Kim | H04W 48/12 455/509 |
| 2015/0016339 A1* | 1/2015 | You | H04J 11/0073 370/328 |
| 2015/0264638 A1* | 9/2015 | Han | H04W 48/16 370/329 |
| 2016/0036617 A1* | 2/2016 | Luo | H04L 27/2662 375/260 |
| 2016/0057653 A1* | 2/2016 | Xu | H04L 27/00 370/229 |
| 2016/0219579 A1* | 7/2016 | Yamazaki | H04L 5/0048 |
| 2017/0373890 A1* | 12/2017 | Fertonani | H04L 25/02 |
| 2018/0159671 A1* | 6/2018 | Kim | H04L 5/0044 |

OTHER PUBLICATIONS

International Search Report and Written Opinion—PCT/US2017/021441—ISA/EPO—dated May 16, 2017.

* cited by examiner

*Primary Examiner* — Jae Y Lee
(74) *Attorney, Agent, or Firm* — Loza & Loza, LLP

(57) ABSTRACT

Various aspects provide for communicating a first set of broadcast reference signals (RSs) in a first subframe that includes a synchronization (SYNC) channel and communicating a second set of broadcast RSs in a second subframe that follows the first subframe. The second subframe may immediately follow the first subframe. A portion of the SYNC channel may include information indicating a configuration of broadcast RSs in one or more other subframes. The brhoadcast RSs may be configured for timing-error estimation, frequency-error estimation, and/or channel estimation. Additional and alternative aspects, embodiments, and features are also provided herein.

26 Claims, 8 Drawing Sheets

COMMUNICATION OF BROADCAST REFERENCE SIGNAL

PRIORITY CLAIM

This application claims priority to and the benefit of provisional patent application No. 62/312,332 filed in the United States Patent and Trademark Office on 23 Mar. 2016, the entire content of which is incorporated herein by reference as if fully set forth below in its entirety and for all applicable purposes.

TECHNICAL FIELD

The technology discussed herein relates, generally, to wireless communication systems, and, more particularly, to communication of broadcast reference signals in various wireless communication systems.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of wireless communication that includes communicating a first set of broadcast reference signals (RSs) in a first subframe that includes a synchronization (SYNC) channel, and communicating a second set of broadcast RSs in a second subframe that follows the first subframe.

In some aspects, the present disclosure also provides an apparatus for wireless communication that includes a means for communicating a first set of broadcast RSs in a first subframe that includes a SYNC channel, and a means for communicating a second set of broadcast RSs in a second subframe that follows the first subframe.

In some aspects, the present disclosure also provides a non-transitory computer-readable medium storing computer-executable code comprising instructions. The instructions may be configured to communicate a first set of broadcast RSs in a first subframe that includes a SYNC channel, and communicate a second set of broadcast RSs in a second subframe that follows the first subframe.

In some aspects, the present disclosure also provides an apparatus for wireless communication that includes a processor, a transceiver communicatively coupled to the at least one processor, and a memory communicatively coupled to the at least one processor. The processor may be configured to utilize the transceiver to communicate a first set of broadcast RSs in a first subframe that includes a SYNC channel, and utilize the transceiver to communicate a second set of broadcast RSs in a second subframe that follows the first subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
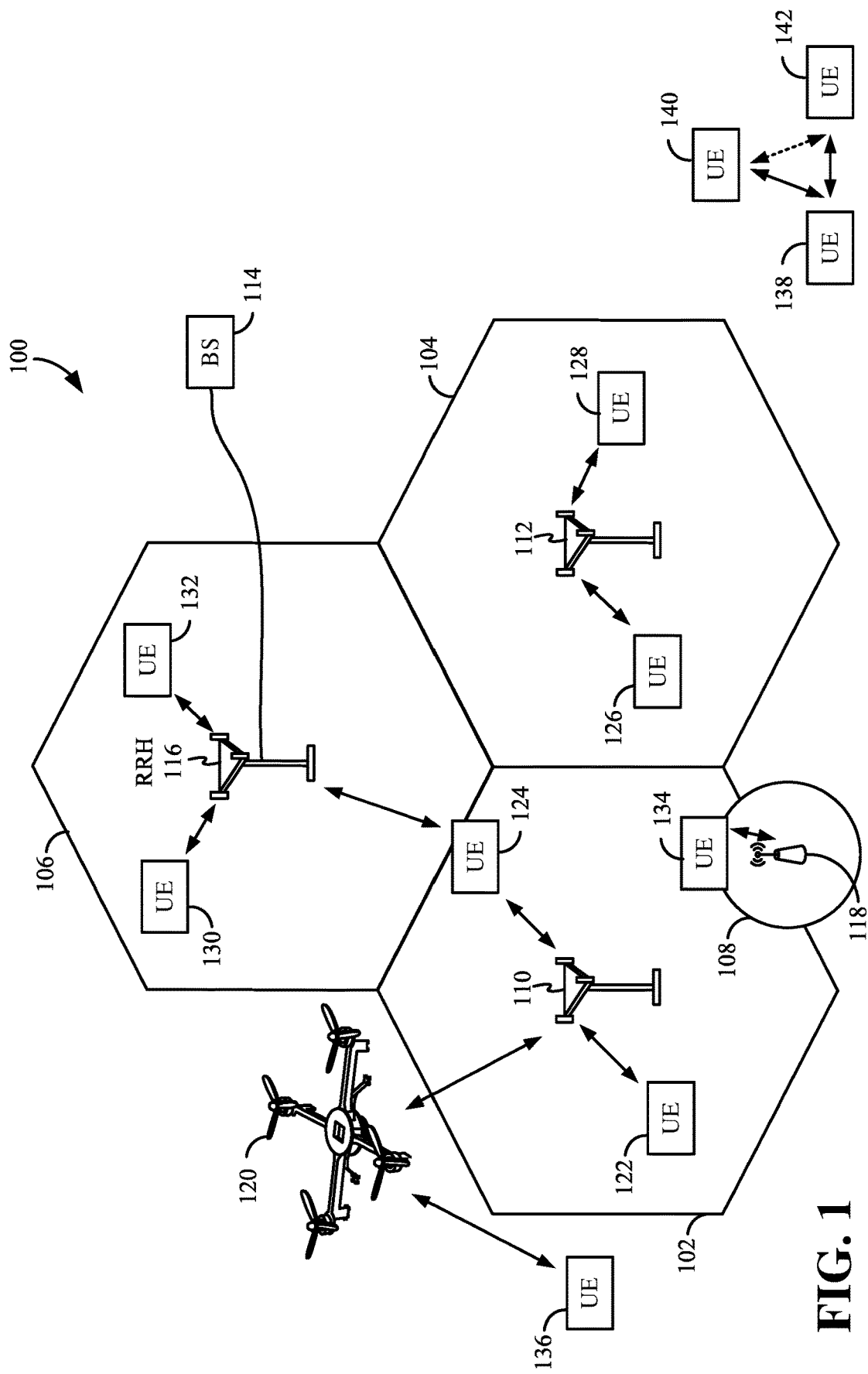
FIG. 1 is a conceptual diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The geographic region covered by the access network 100 may be divided into a number of cellular regions (cells), including macrocells 102, 104, 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110, 112 are shown in certain cells 102, 104 and a third high-power base station 114 is shown controlling a remote radio head (RRH) 116 in cell 106. In this example, the cells 102, 104, 106 may be referred to as macrocells, as the high-power base stations 110, 112, 114 support cells having a large size. Further, a low-power base station 118 is shown in the small cell 108 (e.g., a microcell, picocell, femtocell, home base station, home NB, home eNB, etc.), which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and/or cells. The base stations 110, 112, 114, 118 provide wireless access points to a core network for any number of mobile apparatuses.

FIG. 1 further includes a multicopter 120 (e.g., quadcopter, drone, etc.), which may be configured to function as a base station. That is, in some examples, a cell may not necessarily be stationary, and the geographic area of the cell may move according to the location of a mobile base station, such as the multicopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated as supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multicopter, a quadcopter, a smart energy or security device, municipal lighting, water, or other infrastructure, industrial automation and enterprise devices, consumer and wearable devices (such as eyewear, a wearable camera, a smart watch, a health or fitness tracker, a digital audio player (e.g., MP3 player), a camera, a game console, etc.), and digital home or smart home devices (such as a home audio, video, and multimedia device, an appliance, a sensor, a vending machine, intelligent lighting, a home security system, a smart meter, etc.).

Within the access network 100, the cells may include UEs that may be in communication with one or more sectors of each cell. For example, UE(s) 122, 124 may be in communication with base station 110; UE(s) 126, 128 may be in communication with base station 112; UE(s) 130, 132 may be in communication with base station 114 by way of RRH 116; UE(s) 134 may be in communication with low-power base station 118; and UE(s) 136 may be in communication with multicopter 120. Here, each base station 110, 112, 114, 118, 120 may be configured to provide an access point to a core network (not shown) for all the UEs in the respective cells. In another example, the multicopter 120 may be configured to function as a UE. For example, the multicopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity.

That is, in some examples, a UE may function as a scheduling entity, scheduling resources for one or more subordinate entities (e.g., one or more other UEs). For example, some UE(s) 138 may communicate with other UE(s) 140, 142. In this example, some UE(s) 138 may be functioning as a scheduling entity, and other UE(s) 140, 142 may utilize resources scheduled by such UE(s) 138 for wireless communication. A UE may function as a scheduling entity in a peer-to-peer (P2P) network, and/or in a mesh network. In a mesh network example, UEs 140, 142 may optionally communicate directly with one another in addition to communicating with the scheduling entity 138. Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
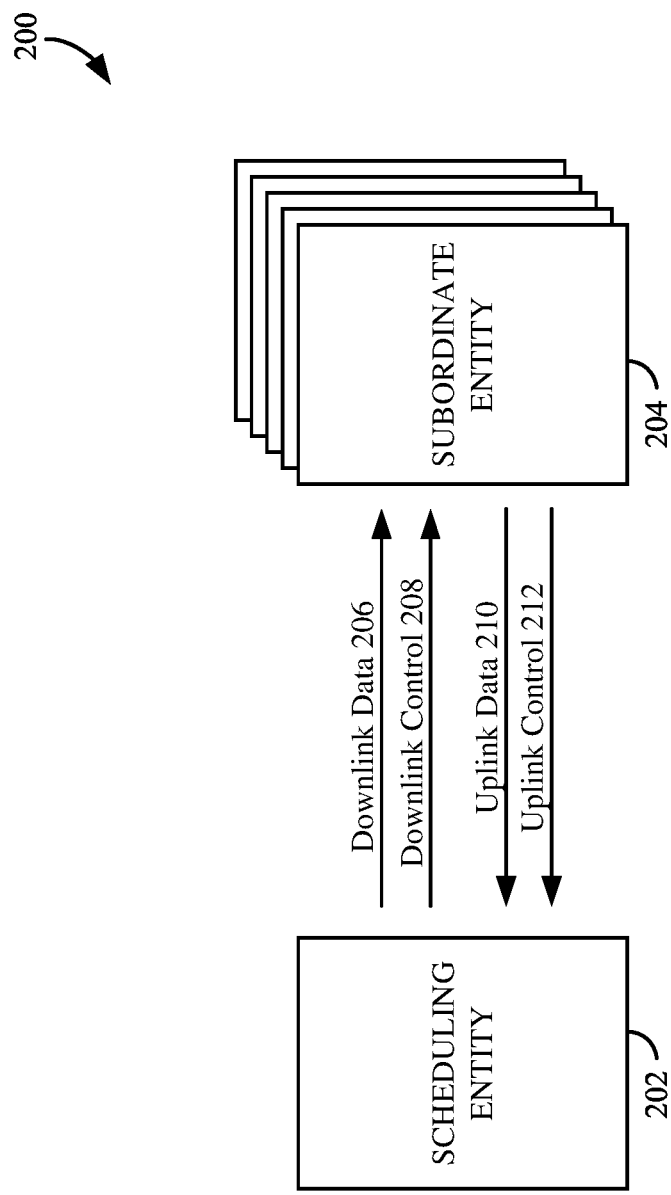
FIG. 2 is a block diagram illustrating an example of a scheduling entity communicating with one or more subordinate entities according to some aspects of the present disclosure.

FIG. 2 is a block diagram 200 illustrating a scheduling entity 202 and a plurality of subordinate entities 204. The scheduling entity 202 may correspond to the base stations 110, 112, 114, 118. In additional examples, the scheduling entity 202 may correspond to the UE 138, the multicopter 120, or any other suitable node in the access network 100. Similarly, in various examples, the subordinate entity 204 may correspond to the UE(s) 122, 124, 126, 128, 130, 132, 134, 136, 138, 140, 142, and/or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network, such as the scheduling entity 202.

The scheduling entity 202 may broadcast a control channel 208 to one or more subordinate entities 204. The downlink control channel 208 may include a variety of packet types and categories, including pilots, reference signals, synchronization signals, system information blocks (SIB s), master information blocks (MIBs), and/or information configured to enable or assist in decoding downlink data transmissions. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and/or information configured to enable or assist in decoding uplink data transmissions. In some examples, the control information 212 may include a scheduling request (SR) (e.g., a request for the scheduling entity 202 to schedule uplink transmissions). In response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique wherein packet transmissions may be checked at the receiving side for accuracy. An ACK may be transmitted if confirmed, and a NACK may be transmitted if not confirmed. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
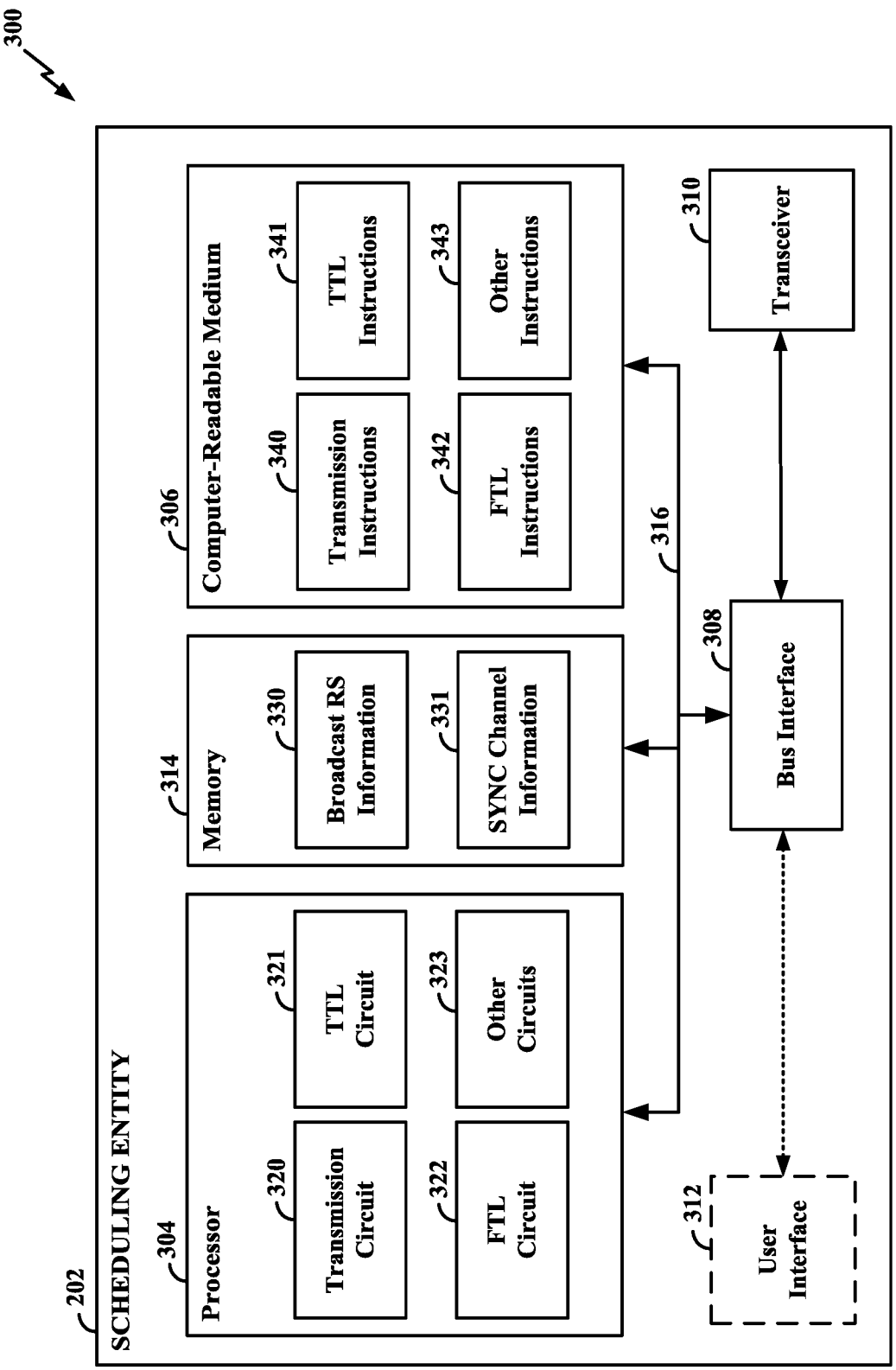
FIG. 3 is a block diagram illustrating an example of a hardware implementation for a scheduling entity according to some aspects of the present disclosure.

FIG. 3 is a diagram 300 illustrating an example of a hardware implementation of the scheduling entity 202 according to various aspects of the present disclosure. The scheduling entity 202 may include a user interface 312. The user interface 312 may be configured to receive one or more inputs from a user of the scheduling entity 202. In some configurations, the user interface 312 may be a keypad, a display, a speaker, a microphone, a joystick, and/or any other suitable component of the scheduling entity 202. The user interface 312 may exchange data via the bus interface 308. The scheduling entity 202 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The scheduling entity 202 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a transmission circuit 320. In some configurations, the transmission circuit 320 may include hardware components and/or may perform various algorithms that provide the means for utilizing the transceiver 310 to communicate a first set of broadcast reference signals (RSs) in a first subframe that includes a synchronization (SYNC) channel In some configurations, the transmission circuit 320 may include hardware components and/or may perform various algorithms that provide the means for utilizing the transceiver 310 to communicate a second set of broadcast RSs in a second subframe that follows the first subframe. The processor 304 may also include a timing-tracking loop (TTL) circuit 321. The TTL circuit 321 may provide the means for generating broadcast RSs that are configured for a TTL operation. The processor 304 may also include a frequency-tracking loop (FTL) circuit 322. The FTL circuit 322 may include various hardware components and/or may perform various algorithms that provide the means for generating broadcast RSs that are configured for an FTL operation. The foregoing description provides a non-limiting example of the processor 304 of the scheduling entity 202. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may include various computer-executable instructions. The computer-executable instructions may include computer-executable code configured to perform various functions and/or enable various aspects described herein. The computer-executable instructions may be executed by various hardware components (e.g., the processor 304 and/or any of its circuits 320, 321, 322, 323) of the scheduling entity 202. The computer-executable instructions may be a part of various software programs and/or software modules. The computer-readable medium 306 may include transmission instructions 340. In some configurations, the transmission instructions 340 may include computer-executable instructions configured for communicating a first set of broadcast RSs in a first subframe that includes the SYNC channel. In some configurations, the transmission instructions 340 may include computer-executable instructions configured for communicating a second set of broadcast RSs in a second subframe that follows the first subframe. The computer-readable medium 306 may also include TTL instructions 341. The TTL instructions 341 may include computer-executable instructions configured for generating broadcast RSs that are configured for a TTL operation. The computer-readable medium 306 may also include FTL instructions 342. In some configurations, the FTL instructions 342 may include computer-executable instructions configured for generating broadcast RSs that are configured for an FTL operation. The foregoing description provides a non-limiting example of the computer-readable medium 306 of the scheduling entity 202. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include broadcast RS information 330. The broadcast RS information 330 may include various types, quantities, configurations, arrangements, and/or forms of information related to the broadcast RSs described in greater detail herein. In some examples, the broadcast RSs information 330 may be configured for timing-error estimation using a TTL operation. In some examples, the broadcast RSs information 330 may be configured for frequency-error estimation using an FTL operation. In some examples, the broadcast RSs information 330 may be configured for channel estimation for decoding a MIB in the SYNC channel The memory 314 may also include SYNC information 331. The SYNC information 331 may include various types, quantities, configurations, arrangements, and/or forms of information related to the SYNC channel as described in greater detail herein. In some examples, a portion of the SYNC channel may include information indicating a configuration of broadcast RSs in one or more other subframes. The foregoing description provides a non-limiting example of the memory 314 of the scheduling entity 202. Although various types of data of the memory 314 are described above, one of ordinary skill in the art will understand that the memory 314 may also include various other data that are in addition and/or alternative(s) to the aforementioned information 330, 331. Such other data may be associated with any one or more of the functions, methods, processes, features and/or aspects described herein.

One of ordinary skill in the art will also understand that the scheduling entity 202 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
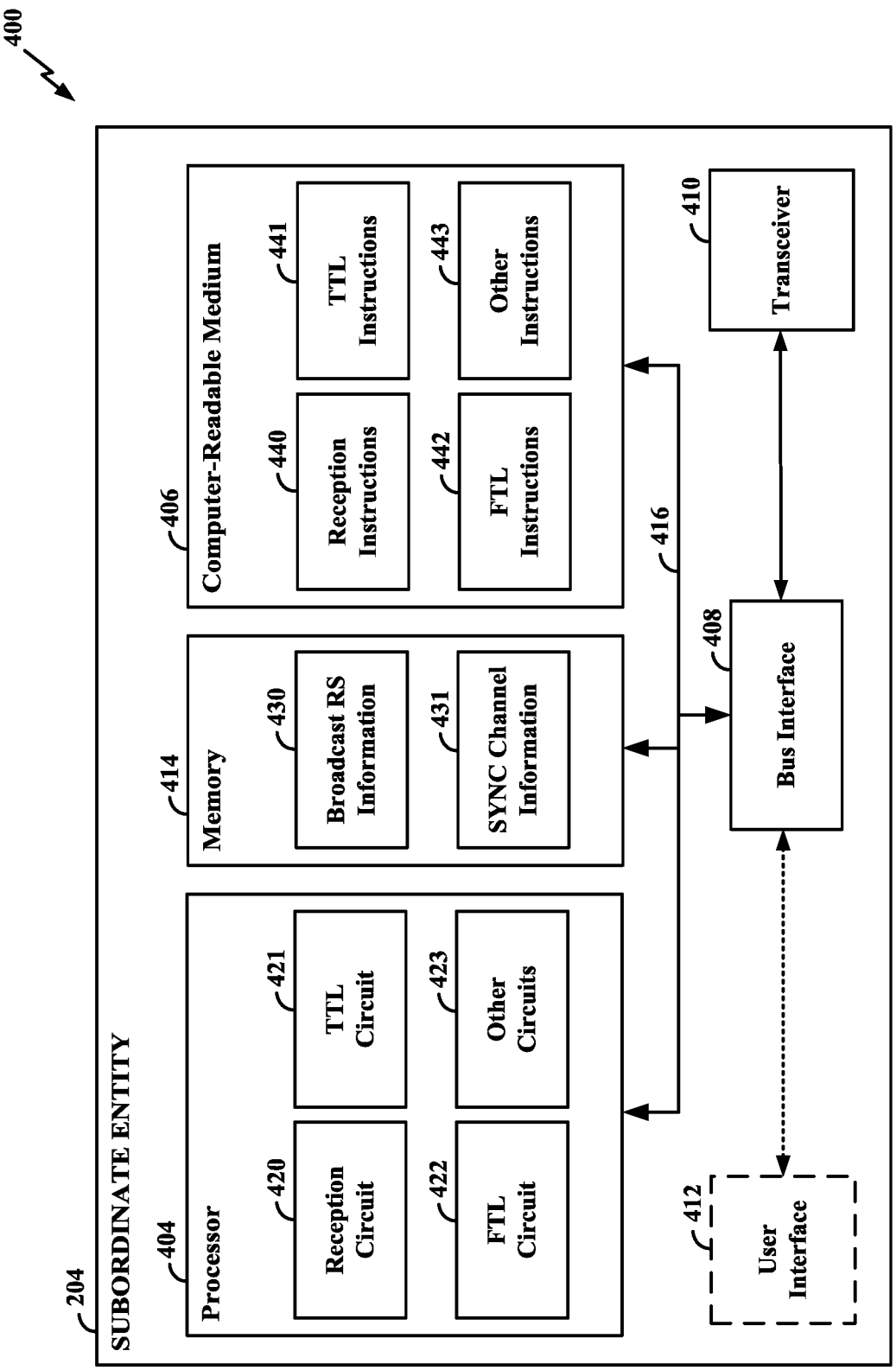
FIG. 4 is a block diagram illustrating an example of a hardware implementation for a subordinate entity according to some aspects of the present disclosure.

FIG. 4 is a diagram 400 illustrating an example of a hardware implementation of the subordinate entity 204 according to various aspects of the present disclosure. The subordinate entity 204 may include a user interface 412. The user interface 412 may be configured to receive one or more inputs from a user of the subordinate entity 204. In some configurations, the user interface 412 may be a keypad, a display, a speaker, a microphone, a joystick, and/or any other suitable component of the subordinate entity 204. The user interface 412 may exchange data via the bus interface 408. The subordinate entity 204 may also include a transceiver 410. The transceiver 410 may be configured to receive data and/or transmit data in communication with another apparatus. The transceiver 410 provides a means for communicating with another apparatus via a wired or wireless transmission medium. The transceiver 410 may be configured to perform such communications using various types of technologies without deviating from the scope of the present disclosure.

The subordinate entity 204 may also include a memory 414, one or more processors 404, a computer-readable medium 406, and a bus interface 408. The bus interface 408 may provide an interface between a bus 416 and the transceiver 410. The memory 414, the one or more processors 404, the computer-readable medium 406, and the bus interface 408 may be connected together via the bus 416. The processor 404 may be communicatively coupled to the transceiver 410 and/or the memory 414.

The processor 404 may include a reception circuit 420. In some configurations, the reception circuit 420 may include hardware components and/or may perform various algorithms that provide the means for utilizing the transceiver 410 to communicate a first set of broadcast RSs in a first subframe that includes a SYNC channel In some configurations, the reception circuit 420 may include hardware components and/or may perform various algorithms that provide the means for utilizing the transceiver 410 to communicate a second set of broadcast RSs in a second subframe that follows the first subframe. In some configurations, the reception circuit 420 may include hardware components and/or may perform various algorithms that provide the means for decoding at least a portion of the SYNC channel The processor 404 may also include a TTL circuit 421. The TTL circuit 421 may provide the means for utilizing the broadcast RSs for a TTL operation. The processor 404 may also include an FTL circuit 422. The FTL circuit 422 may include various hardware components and/or may perform various algorithms that provide the means for utilizing the broadcast RSs for an FTL operation. The foregoing description provides a non-limiting example of the processor 404 of the subordinate entity 204. Although various circuits 420, 421, 422 are described above, one of ordinary skill in the art will understand that the processor 404 may also include various other circuits 423 that are in addition and/or alternative(s) to the aforementioned circuits 420, 421, 422. Such other circuits 423 may provide the means for performing any one or more of the functions, methods, processes, features and/or aspects described herein.

The computer-readable medium 406 may include various computer-executable instructions. The computer-executable instructions may include computer-executable code configured to perform various functions and/or enable various aspects described herein. The computer-executable instructions may be executed by various hardware components (e.g., the processor 404 and/or any of its circuits 420, 421, 422, 423) of the subordinate entity 204. The computer-executable instructions may be a part of various software programs and/or software modules.

The computer-readable medium 406 may include reception instructions 440. In some configurations, the reception instructions 440 may include computer-executable instructions configured for communicating a first set of broadcast RSs in a first subframe that includes a SYNC channel. In some configurations, the reception instructions 440 may include computer-executable instructions configured for communicating a second set of broadcast RSs in a second subframe that follows the first subframe. In some configurations, the reception instructions 440 may include computer-executable instructions configured for decoding at least a portion of the SYNC channel The computer-readable medium 406 may also include TTL instructions 441. The TTL instructions 441 may include computer-executable instructions configured for utilizing the broadcast RSs for a TTL operation. The computer-readable medium 406 may also include FTL instructions 442. In some configurations, the FTL instructions 442 may include computer-executable instructions configured for utilizing the broadcast RSs for an FTL operation. The foregoing description provides a non-limiting example of the computer-readable medium 406 of the subordinate entity 204. Although various computer-executable instructions 440, 441, 442 are described above, one of ordinary skill in the art will understand that the computer-readable medium 406 may also include various other computer-executable instructions 443 that are in addition and/or alternative(s) to the aforementioned computer-executable instructions 440, 441, 442. Such other computer-executable instructions 443 may be configured for any one or more of the functions, methods, processes, features and/or aspects described herein.

The memory 414 may include various memory modules. The memory modules may be configured to store, and have read therefrom, various values and/or information by the processor 404, or any of its circuits 420, 421, 422, 423. The memory modules may also be configured to store, and have read therefrom, various values and/or information upon execution of the computer-executable code included in the computer-readable medium 406, or any of its instructions 440, 441, 442, 443. The memory 414 may include broadcast RS information 430. The broadcast RS information 430 may include various types, quantities, configurations, arrangements, and/or forms of information related to the broadcast RSs described in greater detail herein. In some examples, the broadcast RS information 430 may be configured for timing-error estimation using a TTL operation. In some examples, the broadcast RS information 430 may be configured for frequency-error estimation using an FTL operation. In some examples, the broadcast RS information 430 may be configured for channel estimation for decoding a MIB in the SYNC channel The memory 414 may also include SYNC information 431. The SYNC information 431 may include various types, quantities, configurations, arrangements, and/or forms of information related to the SYNC channel as described in greater detail herein. In some examples, a portion of the SYNC channel may include information indicating a configuration of broadcast RSs in one or more other subframes. The foregoing description provides a non-limiting example of the memory 414 of the scheduling entity 202. Although various types of data of the memory 414 are described above, one of ordinary skill in the art will understand that the memory 414 may also include various other data that are in addition and/or alternative(s) to the aforementioned information 430, 431. Such other data may be associated with any one or more of the functions, methods, processes, features and/or aspects described herein.

One of ordinary skill in the art will also understand that the subordinate entity 204 may include alternative and/or additional features without deviating from the scope of the present disclosure. In accordance with various aspects of the present disclosure, an element, or any portion of an element, or any combination of elements may be implemented with a processing system that includes one or more processors 404. Examples of the one or more processors 404 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 416 and bus interface 408. The bus 416 may include any number of interconnecting buses and bridges depending on the specific application of the processing system and the overall design constraints. The bus 416 may link together various circuits including the one or more processors 404, the memory 414, and the computer-readable medium 406. The bus 416 may also link various other circuits such as timing sources, peripherals, voltage regulators, and power management circuits.

The one or more processors 404 may be responsible for managing the bus 416 and general processing, including the execution of software stored on the computer-readable medium 406. The software, when executed by the one or more processors 404, causes the processing system to perform the various functions described below for any one or more apparatuses. The computer-readable medium 406 may also be used for storing data that is manipulated by the one or more processors 404 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 406.

The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 406 may also include, by way of example, a carrier wave, a transmission line, and any other suitable medium for transmitting software and/or instructions that may be accessed and read by a computer. The computer-readable medium 406 may reside in the processing system, external to the processing system, or distributed across multiple entities including the processing system. The computer-readable medium 406 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 5:
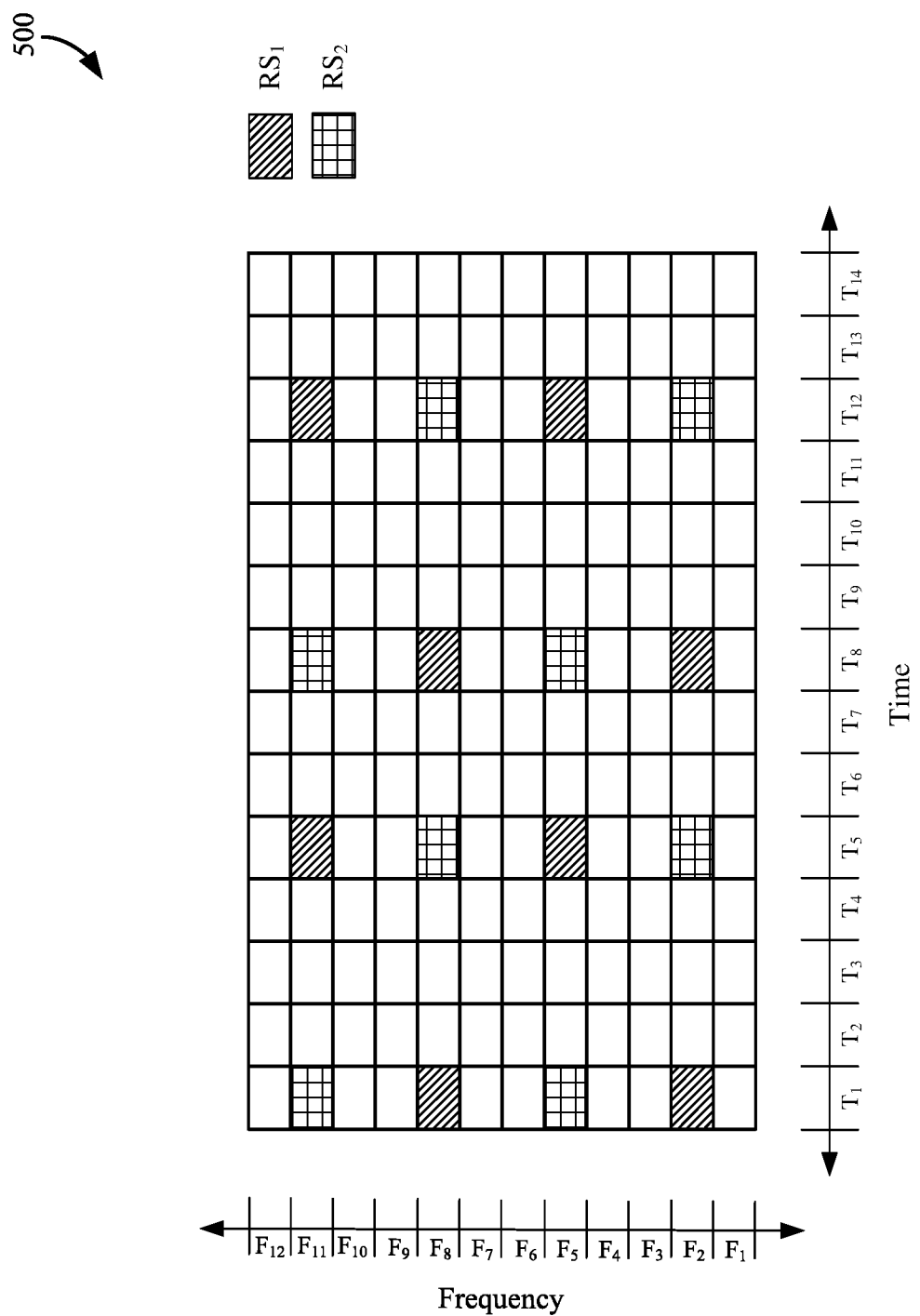
FIG. 5 is a diagram illustrating an example of a subframe configured for wireless communication in some existing systems.

FIG. 5 is a diagram 500 illustrating an example of a subframe configured for wireless communication in some existing systems. In the diagram 500 illustrated in FIG. 5, the horizontal axis represents time, and the vertical axis represents frequency. The subframe includes a plurality of resource elements, which are also referred to as tones. Tones may exist at particular time-frequency combinations. In the subframe illustrated in FIG. 5, various tones are utilized for communication of certain broadcast RSs. For example, some tones are utilized for communication of $RS_1$, and some other tones are utilized for communication of $RS_2$. $RS_1$ may be associated with a first communication port of an apparatus (e.g., scheduling entity 202 and/or subordinate entity 204), and $RS_2$ may be associated with a second communication port of the apparatus (e.g., scheduling entity 202 and/or subordinate entity 204). In some existing systems, the broadcast RSs occur in every subframe and are distributed in both frequency and time throughout each subframe. In other words, some existing systems may enable broadcast RSs to be communicated throughout various tones of the subframes. In FIG. 5, $RS_1$ is shown at the following time-frequency combinations: $T_1$-$F_2$, $T_1$-$F_8$, $T_5$-$F_5$, $T_5$-$F_{11}$, $T_8$-$F_2$, $T_8$-$F_8$, $T_{12}$-$F_5$, and $T_{12}$-$F_{11}$. In FIG. 5, $RS_2$ is shown at the following time-frequency combinations: $T_1$-$F_5$, $T_1$-$F_{11}$, $T_5$-$F_2$, $T_5$-$F_8$, $T_8$-$F_5$, $T_8$-$F_{11}$, $T_{12}$-$F_2$, and $T_{12}$-$F_8$. Such a distribution of broadcast RSs throughout the subframe may enable time-tracking updates and/or frequency-tracking updates in each and every subframe.

Generally, broadcast RSs may refer to RSs targeted to be used by more than one users (rather than being intended to be used by a specific user) for performance common UE functionalities, including, but not limited to, driving various control loops for the UE, such as timing error estimation, frequency error estimation, and/or power-delay-profile estimation. Such RSs may sometimes be referred to as cell-specific reference signals (CRSs) and/or various other suitable terms without necessarily deviating from the scope of the present disclosure. In some configurations, the subordinate entity 204 may perform a TTL operation utilizing the broadcast RSs to estimate timing error. In some configurations, the subordinate entity 204 may perform an FTL operation utilizing the broadcast RSs to estimate frequency error.

With respect to TTL, the 'pull-in range' of the TTL operation may refer to the range of timing error that the TTL operation can correct. Accordingly, a relatively larger pull-in range for the TTL operation may provide relatively better timing error estimations. Generally, the pull-in range of the TTL operation is proportional to the frequency-domain density of the broadcast RSs used for time tracking. For example, referring to the subframe illustrated in FIG. 5, the frequency-domain density of $RS_1$ is two in every twelve tones. For instance, at time $T_1$, $RS_1$ exists at two tones (e.g., at $F_2$, $F_8$) of the twelve tones (e.g., at $F_1$-$F_{12}$). The frequency-domain density of $RS_2$ is the same as that of $RS_1$. For instance, at time $T_1$, $RS_2$ exists at two tones (e.g., at $F_5$, $F_{11}$) of the twelve tones (e.g., at $F_1$-$F_{12}$).

Because the pull-in range of the TTL operation is proportional to the frequency-domain density of the broadcast RSs used of time tracking, staggering and/or de-staggering the broadcast RSs in the time domain may have an impact on the pull-in range of the TTL operation. For example, as illustrated in FIG. 5, at time $T_1$, $RS_1$ is communicated at frequencies $F_2$, $F_8$, and, at time $T_5$, $RS_1$ is communicated at frequencies $F_5$, $F_{11}$; however, in the frequency domain, $RS_1$ is effectively (e.g., equivalently) communicated at frequencies $F_2$, $F_5$, $F_8$, $F_{11}$. Once de-staggered, $RS_1$ has a frequency density of four tones (e.g., at $F_2$, $F_5$, $F_8$, $F_{11}$) in every twelve tones (e.g., at $F_1$-$F_{12}$), which represents a relatively higher frequency-domain density of the broadcast RSs (e.g., $RS_1$). Because the pull-in range of the TTL operation is proportional to the frequency-domain density of the broadcast RSs (e.g., $RS_1$), the de-staggering of the broadcast RSs (e.g., $RS_1$) can result in a greater pull-in range for the TTL operation.

With respect to FTL, the 'pull-in range' of the FTL may refer to the range of frequency error that the FTL operation can correct. Accordingly, a relatively larger pull-in range for the FTL operation may provide relatively better frequency error estimations. Generally, the pull-in range of the FTL operation is proportional to the time-domain density of the broadcast RSs used for frequency tracking. For example, referring to the subframe illustrated in FIG. 5, the time-domain density of $RS_1$ is four symbols in every fourteen symbols. For instance, $RS_1$ is communicated during four symbols (e.g., at $T_1$, $T_5$, $T_8$, $T_{12}$) of the total fourteen symbols (e.g., at $T_1$-$T_{14}$). If the time-domain density of the broadcast RSs is increased, the pull-in range of the FTL operation may be increased. Conversely, if the time-domain density of the broadcast RSs is decreased, the pull-in range of the FTL operation may be decreased. Notably, however, more than one time slot or symbol is typically required to drive the FTL operation. In other words, the FTL operation may not function properly with just one 'look' (e.g., a single time slot or symbol having broadcast RSs). That is, the FTL operation may need two (or more) sets of broadcast RSs separated by time.

Figure 6:
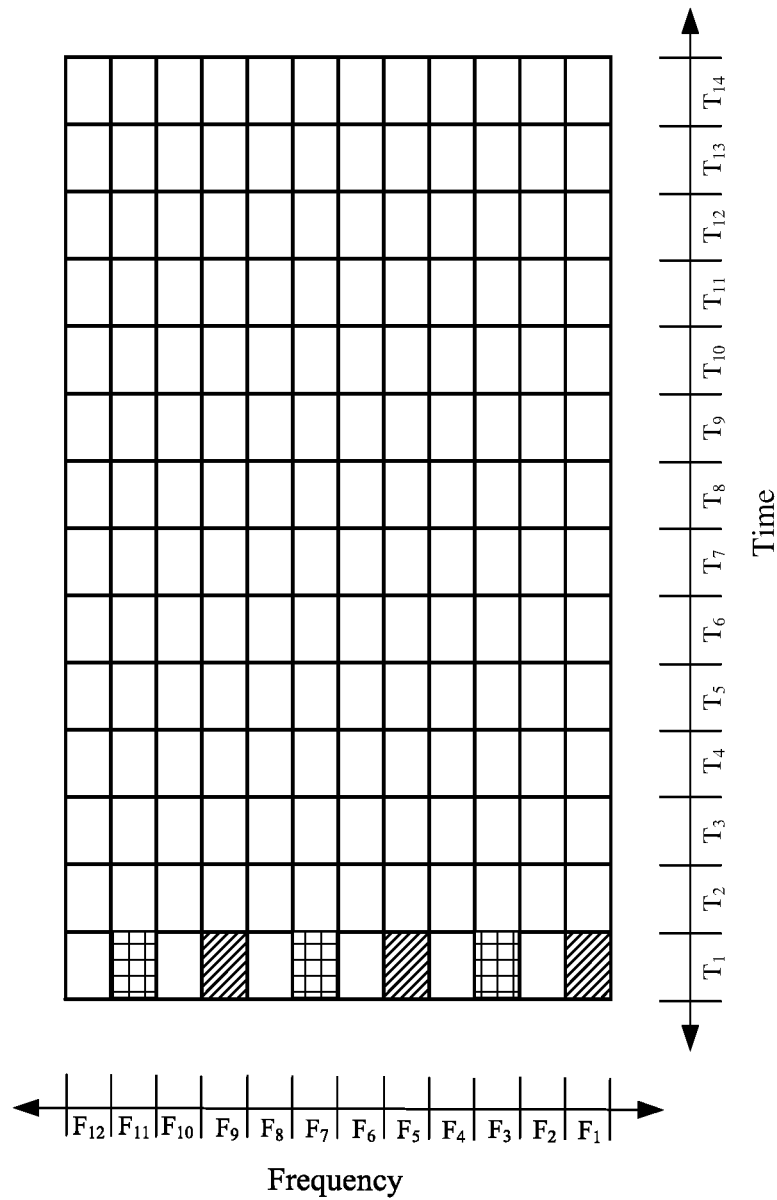
FIG. 6 is a diagram illustrating an example of a subframe configured for wireless communication according to some aspects of the present disclosure.

One of ordinary skill in the art will understand that TTL and/or FTL may be performed for error estimation with respect to various channels without necessarily deviating from the scope of the present disclosure. Although some examples described herein may refer to a SYNC channel, the aspects described herein may be implemented in and/or applied to various other types of channels without necessarily deviating from the scope of the present disclosure. In some configurations, the SYNC channel may include a primary sychronization signal (PSS), a secondary synchronization signal (SSS), and/or a MIB. The PSS, SSS, and/or MIB may be included in the subframe in various time and/or frequency configurations without necessarily deviating from the scope of the present disclosure. In some existing systems, the SYNC channel may be communicated periodically (e.g., every ten subframes). In some configurations, the subordinate entity 204 may utilize the PSS and/or SSS to derive a cell identifier (ID). Based on the cell ID, the subordinate entity 204 may determine how to descramble the broadcast RSs. By descrambling the broadcast RSs, the subordinate entity 204 may be enabled to perform channel estimation. After performing channel estimation, the subordinate entity 204 may be enabled to decode the MIB that is included in the SYNC channel FIG. 6 is a diagram 600 illustrating an example of a subframe configured for wireless communication according to some aspects of the present disclosure. As shown in the example illustrated in FIG. 6, the subframe includes broadcast RSs that are not distributed in time within a single subframe. For example, in some configurations, the broadcast RSs are included in a single set of broadcast RSs localized at a single symbol (e.g., at $T_1$). In other words, the broadcast RSs are not communicated at other times (e.g., $T_2$-$T_{14}$). Put yet another way, there is only one 'look' (in the time domain) with respect to the broadcast RSs in each subframe. Accordingly, the broadcast RSs are relatively less dense in the example illustrated in FIG. 6 relative to the example illustrated in FIG. 5. As such, the resources of that single set of tones (e.g., at $T_1$) are 'stretched' further (e.g., to accommodate $RS_1$, $RS_2$, etc.) in the example illustrated in FIG. 6 relative to the example illustrated in FIG. 5.

In some configurations, the broadcast RSs are 'on demand,' meaning that the broadcast RSs may be optional and, under some circumstances, may not be communicated in the subframe. Unlike the example described above with reference to FIG. 5, there exists no guarantee or requirement that every subframe will include broadcast RSs. For example, when control information is not included in the subframe, broadcast RSs may sometimes not be communicated in that subframe. In other words, because broadcast RSs may sometimes be used for decoding control information, broadcast RSs may not be necessary in circumstances where the subframe does not include control information. This is a non-limiting example of a circumstance in which broadcast RSs may not be communicated; however, one of ordinary skill in the art understands that various other circumstances existed in which broadcast RSs may not be communicated. Power consumption may be less in circumstances in which broadcast RSs are not communicated in the subframe relative to circumstances in which broadcast RSs are communicated in the subframe.

However, the absence of broadcast RSs in the subframe may have some potential drawbacks. Firstly, the FTL operation may be adversely impacted. As described in greater detail above, the FTL operation is driven by two (or more) sets of resource RSs (separated in time) (e.g., two or more 'looks' at the broadcast RSs). However, because there exists no guarantee that the broadcast RSs will appear at least two times, then there may exist circumstances where there is insufficient information (from the broadcast RSs) to drive the FTL operation. Secondly, the TTL operation may also be adversely impacted. As also described in greater detail above, the TTL operation can benefit from staggering of resource RSs in time, because the frequency-domain density of the de-staggered resource RSs can enhance the pull-in range of the TTL operation. However, because there exists no guarantee that the broadcast RSs will be distributed in time throughout the subframe, the potential benefits of de-staggering for increasing the pull-in range of the TTL operation may not exist. Thirdly, SYNC channel decoding may be adversely impacted. As also described in greater detail above, by descrambling the broadcast RSs, the subordinate entity 204 may perform channel estimation, after which the subordinate entity 204 may decode the MIB that is included in the SYNC channel. However, because there exists no guarantee that the broadcast RSs will be included in the subframe, the subordinate entity 204 may not properly perform channel estimation in some circumstances and, in turn, may not properly decode the MIB that is included in the SYNC channel. The foregoing examples of potential drawbacks are non-limiting, and other potential drawbacks may also exist. To address and overcome such potential drawbacks, aspects of the present disclosure provide for communicating certain broadcast RSs when a subframe includes a SYNC channel.

Figure 7:
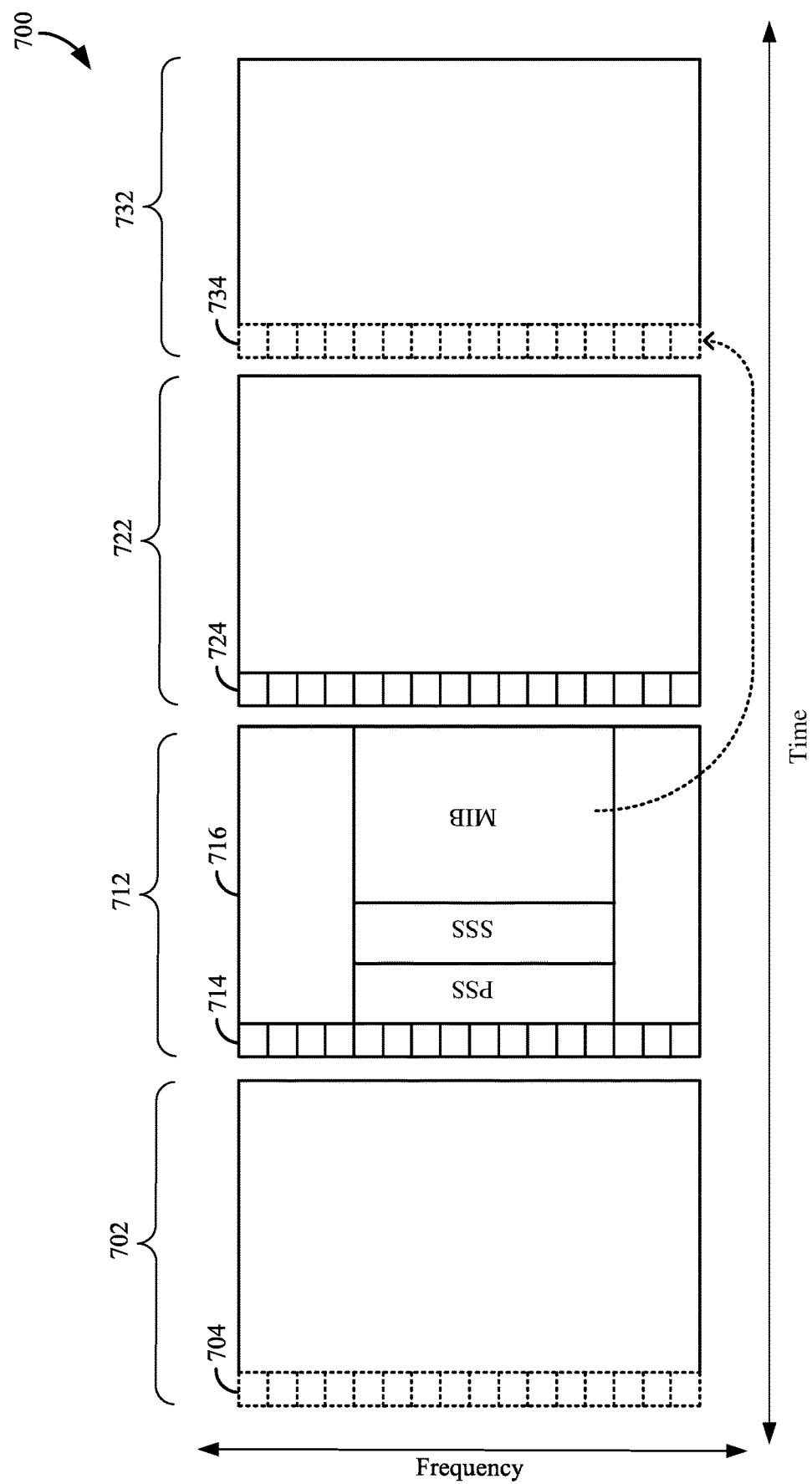
FIG. 7 is a diagram illustrating an example of various subframes configured for wireless communication according to some aspects of the present disclosure.

FIG. 7 is a diagram 700 illustrating an example of various subframes configured for wireless communication according to some aspects of the present disclosure. The example illustrated in FIG. 7 includes four subframes 702, 712, 722, 732. A subframe 712 may include an initial symbol 714 that includes a first set of broadcast RSs. The remaining symbols 716 of that subframe 712 may include the SYNC channel, which may include the PSS, SSS, and MIB. Another subframe 722 may include an initial symbol 724 that includes a second set of broadcast RSs. The SYNC channel is 'anchored' by a pair of broadcast RSs that may be used for error estimation (e.g., timing-error estimation and/or frequency-error estimation). For example, these broadcast RSs may be utilized in a TTL operation and/or FTL operation, which are described in greater detail above.

As illustrated in FIG. 7, one set of broadcast RSs is communicated in a subframe that includes the SYNC channel, and another set of broadcast RSs is communicated in another subframe (e.g., a subframe that follows the subframe that includes the SYNC channel). Other subframes 702, 732 communicated before or after the subframe 712 that includes the SYNC channel may include the above-described 'on demand' (e.g., optional) broadcast RSs, and these 'on demand' broadcast RSs may be included in the initial symbol 704, 734 of their respective subframe 702, 732. In some configurations, the first set of broadcast RSs of a first subframe 712 is the only set of broadcast RSs include in the subframe, and the second set of broadcast RSs of the second subframe 722 (e.g., that follows that first subframe 712) is the only set of broadcast RSs included in the second subframe 722.

In some configurations, a portion of the subframe (e.g., the MIB) and/or a portion of another subframe or frame (e.g., a subframe or frame that includes a SIB, or any connection setup information between MIB and SIB) may contain information associated with (e.g., regarding) a configuration of broadcast RSs in other subframe(s). For example, as illustrated in FIG. 7, information included in the MIB of a subframe 712 may indicate a configuration of broadcast RSs included in a symbol 734 of another subframe 732. The information associated with (e.g., regarding) the configuration of the broadcast RSs in the one or more subframes may include, but is not limited to: (i) information indicating whether such broadcast RSs (or at least a portion thereof) are beamformed or broadcasted, (ii) information indicating whether such broadcast RSs (or at least a portion thereof) can be used for tracking purposes (e.g., time-tracking, frequency-tracking, power-delay-profile tracking, and other suitable types of tracking), (iii) information indicating whether such broadcast RSs (or at least a portion thereof) are 'on-demand' and, if not 'on-demand,' the periodicity of such broadcast RSs (or at least a portion thereof), and/or (iv) any other suitable information associated with the configuration of such broadcast RSs (or at least a portion thereof).

Although various examples described herein indicate that the broadcast RSs may be included in the initial symbol of the subframe, one of ordinary skill in the art will understand that the broadcast RSs may be included in alternative symbols of the subframe without necessarily deviating from the scope of the present disclosure. Also, although various examples described herein indicate that the broadcast RSs communicated after the SYNC channel are included in a subframe different from (e.g., following or subsequent to) the subframe that includes the SYNC channel, one of ordinary skill in the art will understand that such broadcast RSs may alternatively be included in the same subframe as the subframe that includes the SYNC channel (e.g., at the tail or end portion of the subframe, after the SYNC channel) without necessarily deviating from the scope of the present disclosure.

Such aspects enable various benefits to the communication system and the overall user experience. Firstly, with respect to TTL, the broadcast RSs can be de-staggered to obtain a longer pull-in range. That is, the pair of broadcast RSs (e.g., communicated before and after the SYNC channel) can be de-staggered to obtain a longer pull-in range. In other words, the broadcast RSs staggered in time (e.g., one set of broadcast RSs being communicated before the SYNC channel, and one set of broadcast RSs being communicated after the SYNC channel) can be de-staggered to provide a relatively higher frequency-domain density of broadcast RSs, which in turn enables a relatively longer pull-in range for timing error estimation.

Secondly, with respect to FTL, the paired broadcast RSs can drive the FTL operation, which typically requires at least two sets of broadcast RSs. As described in greater detail above, the FTL operation needs more than just one 'look' in the time domain, and the paired set of broadcast RSs drive the FTL operation for frequency error estimation. Thirdly, the broadcast RS-based FTL operation can be combined with frequency offset bin estimations from the SYNC channel to obtain relatively more accurate frequency offset estimation. For instance, the PSS of the SYNC channel may sometimes provide a relatively coarse frequency error estimation (e.g., approximate ranges or 'bins' of frequency error estimates), which alone may be inadequate for reliable frequency error estimations. However, if these relatively coarse frequency error estimations are combined with relatively finer frequency error estimations available based on FTL operations (using the sets of broadcast RSs), then the overall accuracy of the frequency error estimations may be better than it might be otherwise.

Fourthly, with respect to SYNC channel detection, the paired broadcast RSs may enable non-causal channel estimation for MIB decoding, thereby resulting in a relatively more robust SYNC detection capability. When channel estimation for MIB decoding is performed based solely on broadcast RSs before (e.g., preceding) the MIB, that manner of channel estimation is sometimes referred to as 'causal.' Conversely, when channel estimation for MIB decoding is performed based on broadcast RSs that occur before (e.g., preceding) and after (e.g., subsequent to) the MIB, then that manner of channel estimation is sometimes referred to as 'non-causal.' For non-causal channel estimation, a buffer may temporarily store the first set of broadcast RSs (e.g., in the initial symbol 714 of the subframe 712) as well as the MIB (e.g., in the remaining symbols 716 of the subframe 712) and, upon communicating the second set of broadcast RSs (e.g., in the initial symbol 724 of the subframe 722), interpolate (e.g., as oppose to extrapolate) the channel estimate for purposes of MIB decoding. In some aspects, this may enable a relatively more accurate channel estimate for MIB decoding relative some alternatives (e.g., alternatives that do not utilize such a 'non-causal' form of channel estimation). Fifthly, in circumstances where the cell-specific broadcast RSs cannot be used to decode the MIB (e.g., circumstances a SYNC channel is transmitted concurrently by multiple scheduling entities (e.g., eNBs)), code-division multiplexing of UE-centric RSs with the broadcast RSs may enable the capability to better perform channel estimation and MIB decoding.

Figure 8:
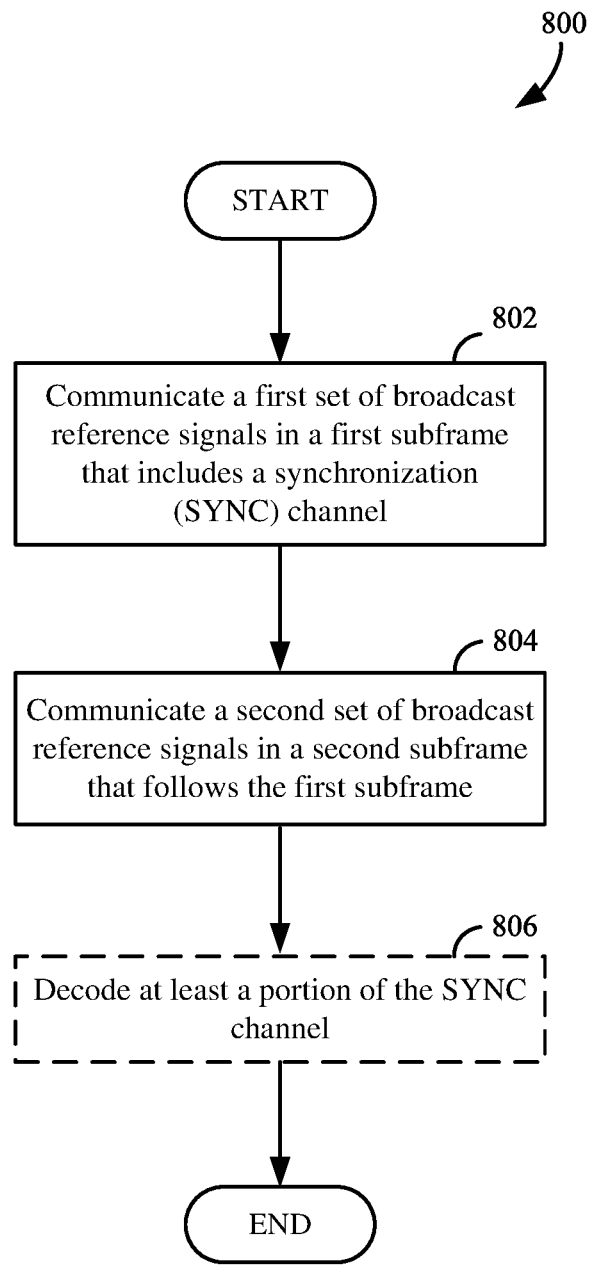
FIG. 8 is a diagram illustrating an example of various methods and/or processes according to some aspects of the present disclosure.

FIG. 8 is a diagram 800 illustrating an example of various methods and/or processes according to some aspects of the present disclosure. The methods and/or processes may be performed by an apparatus configured for wireless communication. In some configurations, the apparatus is the scheduling entity 202. In some configurations, the apparatus is the subordinate entity 204. At block 802, the apparatus may communicate a first set of broadcast RSs in a first subframe that includes a SYNC channel. In other words, the first set of broadcast RSs are included in the same subframe as the SYNC channel Referring to FIG. 7, the apparatus may communicate a first set of broadcast RSs in a first subframe 712, which also includes a PSS, SSS, and/or MIB of the SYNC channel One of ordinary skill in the art will understand that, temporally, the first set of broadcast RSs may exist at various time slots of the first subframe (e.g., due to various frequency-division multiplexing schemes) without necessarily deviating from the scope of the present disclosure. At block 804, the apparatus may communicate a second set of broadcast RSs in a second subframe that follows the first subframe. For example, referring to FIG. 7, the apparatus may communicate a second set of broadcast RSs in a second subframe 722, which follows the first subframe 712.

In some configurations, such as when the apparatus is the subordinate entity 204, at block 806, the apparatus may process at least a portion of the SYNC channel For example, referring to FIG. 7, the apparatus may decode the MIB of the SYNC channel. In some configurations, once the SYNC channel is detected, the first and second set of broadcast RSs may assist with the decoding of a portion (e.g., MIB) of the SYNC channel, although this is not necessarily a requirement in every implementation.

In some configurations, the first set of broadcast RSs of the first subframe 712 is the only set of broadcast RSs include in the first subframe, and the second set of broadcast RSs of the second subframe 722 is the only set of broadcast RSs included in the second subframe 722. In some configurations, the broadcast RSs are configured for timing-error estimation using a TTL operation. In some configurations, the broadcast RSs are configured for frequency-error estimation using an FFL operation. In some configurations, the broadcast RSs are configured for channel estimation for decoding the MIB in the SYNC channel In some configurations, a portion of the SYNC channel (e.g., the MIB) may include information indicating a configuration of broadcast RSs in one or more other subframes. In some configurations, such as when the apparatus is the scheduling entity 202, the communication of the broadcast RSs includes the transmission of the broadcast RSs. In some configurations, such as when the apparatus is the subordinate entity 204, the communication of the broadcast RSs includes the reception of the broadcast RSs.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, the method comprising:
    communicating a first set of broadcast reference signals (RSs) in a first subframe that includes a synchronization (SYNC) channel comprising a master information block (MIB), wherein the first set of broadcast RSs is the only set of broadcast RSs in the first subframe and the first set of broadcast RSs is communicated in only a single symbol of the first subframe that precedes the SYNC channel;
    communicating a second set of broadcast RSs in a second subframe that follows the first subframe; and
    performing channel estimation for decoding the MIB in the SYNC channel by storing the first set of broadcast RSs and the MIB in a buffer and, upon communicating the second set of broadcast RSs, interpolating the channel estimation based on the first set of broadcast RSs and the second set of broadcast RSs.

2. The method of claim 1, wherein the second subframe immediately follows the first subframe.

3. The method of claim 1, wherein the second set of broadcast RSs is the only set of broadcast RSs in the second subframe.

4. The method of claim 1, wherein the broadcast RSs are configured for timing-error estimation using a timing-tracking loop operation.

5. The method of claim 1, wherein the broadcast RSs are configured for frequency-error estimation using a frequency-tracking loop operation.

6. The method of claim 1, wherein a portion of the SYNC channel comprises information indicating a configuration of broadcast RSs in one or more other subframes.

7. The method of claim 1, wherein communicating the broadcast RSs comprises transmitting the broadcast RSs.

8. The method of claim 1, wherein communicating the broadcast RSs comprises receiving the broadcast RSs, and wherein the method further comprises:
    decoding at least a portion of the SYNC channel.

9. An apparatus for wireless communication, the apparatus comprising:
    means for communicating a first set of broadcast reference signals (RSs) in a first subframe that includes a synchronization (SYNC) channel comprising a master information block (MIB), wherein the first set of broadcast RSs is the only set of broadcast RSs in the first subframe and the first set of broadcast RSs communicated in only a single symbol of the first subframe that precedes the SYNC channel;
    means for communicating a second set of broadcast RSs in a second subframe that follows the first subframe and;
    means for performing channel estimation for decoding the MIB in the SYNC channel by storing the first set of broadcast RSs and the MIB in a buffer and, upon communicating the second set of broadcast RSs, interpolating the channel estimation based on the first set of broadcast RSs and the second set of broadcast RSs.

10. The apparatus of claim 9, wherein the second subframe immediately follows the first subframe.

11. The apparatus of claim 9, wherein the second set of broadcast RSs is the only set of broadcast RSs in the second subframe.

12. The apparatus of claim 9, wherein the broadcast RSs are configured for timing-error estimation using a timing-tracking loop operation.

13. The apparatus of claim 9, wherein the broadcast RSs are configured for frequency-error estimation using a frequency-tracking loop operation.

14. The apparatus of claim 9, wherein a portion of the SYNC channel comprises information indicating a configuration of broadcast RSs in one or more other subframes.

15. A non-transitory computer-readable medium storing computer-executable code comprising instructions configured to:
    communicate a first set of broadcast reference signals (RSs) in a first subframe that includes a synchronization (SYNC) channel comprising a master information block (MIB), wherein the first set of broadcast RSs is the only set of broadcast RSs in the first subframe and the first set of broadcast RSs communicated in only a single symbol of the first subframe that precedes the SYNC channel;
    communicate a second set of broadcast RSs in a second subframe that follows the first subframe; and
    perform channel estimation for decoding the MIB in the SYNC channel by storing the first set of broadcast RSs and the MIB in a buffer and, upon communicating the second set of broadcast RSs, interpolating the channel estimation based on the first set of broadcast RSs and the second set of broadcast RSs.

16. The non-transitory computer-readable medium of claim 15, wherein the second subframe immediately follows the first subframe.

17. The non-transitory computer-readable medium of claim 15, wherein the second set of broadcast RSs is the only set of broadcast RSs in the second subframe.

18. The non-transitory computer-readable medium of claim 15, wherein the broadcast RSs are configured for timing-error estimation using a timing-tracking loop operation.

19. The non-transitory computer-readable medium of claim 15, wherein the broadcast RSs are configured for frequency-error estimation using a frequency-tracking loop operation.

20. The non-transitory computer-readable medium of claim 15, wherein a portion of the SYNC channel comprises information indicating a configuration of broadcast RSs in one or more other subframes.

21. An apparatus for wireless communication, the apparatus comprising:
a processor;
a transceiver communicatively coupled to the processor; and
a memory communicatively coupled to the processor, wherein the processor is configured to:
utilize the transceiver to communicate a first set of broadcast reference signals (RSs) in a first subframe that includes a synchronization (SYNC) channel comprising a master information block (MIB), wherein the first set of broadcast RSs is the only set of broadcast RSs in the first subframe and the first set of broadcast RSs communicated in only a single symbol of the first subframe that precedes the SYNC channel;
utilize the transceiver to communicate a second set of broadcast RSs in a second subframe that follows the first subframe; and
perform channel estimation for decoding the MIB in the SYNC channel by storing the first set of broadcast RSs and the MIB in a buffer and, upon communicating the second set of broadcast RSs, interpolating the channel estimation based on the first set of broadcast RSs and the second set of broadcast RSs.

22. The apparatus of claim 21, wherein the second subframe immediately follows the first subframe.

23. The apparatus of claim 21, wherein the second set of broadcast RSs is the only set of broadcast RSs in the second subframe.

24. The apparatus of claim 21, wherein the broadcast RSs are configured for timing-error estimation using a timing-tracking loop operation.

25. The apparatus of claim 21, wherein the broadcast RSs are configured for frequency-error estimation using a frequency-tracking loop operation.

26. The apparatus of claim 21, wherein a portion of the SYNC channel comprises information indicating a configuration of broadcast RS s in one or more other subframes.

* * * * *